(12) United States Patent
Holzheimer (10) Patent No.: US 6,295,035 B1
(45) Date of Patent: Sep. 25, 2001

(54) CIRCULAR DIRECTION FINDING ANTENNA

(75) Inventor: Timothy R. Holzheimer, Rockwall, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/450,796

(22) Filed: Nov. 29, 1999

Related U.S. Application Data
(60) Provisional application No. 60/110,472, filed on Nov. 30, 1998.

(51) Int. Cl.[7] ............................ H01Q 11/10; H01Q 21/26
(52) U.S. Cl. ........................ 343/792.5; 343/797; 343/799
(58) Field of Search .................................. 343/792.5, 790, 343/791, 797, 799, 800, 810, 893, 853, 789; H01Q 11/10

(56) References Cited

U.S. PATENT DOCUMENTS

| | | | |
|---|---|---|---|
| 3,731,316 | * 5/1973 | Sheleg | 343/854 |
| 4,101,901 | * 7/1978 | Kommrusch | 343/853 |
| 4,594,595 | * 6/1986 | Struckman | 343/792.5 |
| 4,962,383 | * 10/1990 | Tresselt | 343/853 |
| 5,021,796 | * 6/1991 | Corzine et al. | 343/792.5 |
| 5,164,738 | * 11/1992 | Walter et al. | 343/792.5 |
| 5,276,457 | * 1/1994 | Agarwal et al. | 343/789 |
| 5,506,592 | * 4/1996 | MacDonald et al. | 343/846 |
| 5,936,588 | * 8/1999 | Rao et al. | 343/754 |

OTHER PUBLICATIONS

PCT Written Opinion dated Oct. 19, 2000 for PCT/US99/28127 filed Nov. 30, 1999.

* cited by examiner

*Primary Examiner*—Don Wong
*Assistant Examiner*—Hoang Nguyen
(74) *Attorney, Agent, or Firm*—Baker Botts L.L.P.

(57) ABSTRACT

An antenna system that includes a plurality of mounting plates arranged in a generally circular configuration. Each mounting plate has an inside surface and an outside surface. Each antenna element has a high frequency end and a low frequency end. The low frequency end of each antenna element is mounted to the inside surface of one of the mounting plates such that the high frequency ends of opposed antenna elements face each other. The high frequency ends of opposed antennas are separated by one wavelength of the signal frequency received at the high frequency end. The antenna system also includes a beamforming network having a plurality of input ports equal to the number of antenna elements. Each antenna element is coupled to the beamforming network through a respective input port.

32 Claims, 8 Drawing Sheets

CIRCULAR DIRECTION FINDING ANTENNA

RELATED APPLICATIONS

This application claims the benefit of U.S. Provisional Application Ser. No. 60/110,472, filed Nov. 30, 1998.

TECHNICAL FIELD OF THE INVENTION

This invention relates generally to antennas and more particularly to a circular direction finding antenna.

BACKGROUND OF THE INVENTION

A generic Direction Finding (DF) system consists of four major components: the antenna system, the receiver, one or more processors and the control/output system. The antenna system must address the contradictory requirements of both an omnidirectional pattern that permits reception over the widest possible field of view, and a "pencil beam" that permits great accuracy in determining the angle of arrival of an intercepted signal. These conflicting requirements cannot be met with a single static antenna. Resort, therefore, is often made to the use of an antenna array, a spinning narrow-band pattern antenna, or a phased array (an antenna capable of rapidly altering its radiation pattern by electronic means). One major problem with the spinner type of DF antenna is that once it locks onto a target, it is blind to the rest of the field of view. Phased array antennas have the disadvantage of requiring an assortment of expensive electronics to conduct the electronic beam scanning.

The fundamental trade-off between instantaneous field of view and time available for an observation is a design consideration of any DF system. Even an antenna with a modest field of view can be used to provide 360 degree coverage in a direction finder by rotating the antenna. However, rotating the antenna poses problems when dealing with frequency-agile emission or signals of short duration. The mean time required to intercept a signal and the duration of the signal being sampled critically depend upon the coincidence of the transmitting antenna pattern, which may also be turning, and the rotating DF antenna. It is such trade-offs that make the design of an effective DF system a challenge.

Previous attempts at designing such an antenna have all had various problems such as low gain, limited operational bandwidth, excessive size and weight, low angle of arrival (AOA) accuracy, and limited azimuthal field of view once a target is acquired. Some previous antenna designs have used low-gain dipole or spiral antenna elements. These designs offer simultaneous field of view coverage, but suffer from limited bandwidth and low AOA accuracy. Other antenna designs have larger bandwidths, but do not offer simultaneous coverage over the entire field of view.

SUMMARY OF THE INVENTION

Accordingly, there is a need for a high accuracy, high gain, simultaneous track and scan, circular direction finding antenna. The present invention provides a circular direction finding antenna that addresses shortcomings of prior systems.

In accordance with one aspect of the present invention, an antenna system is provided that includes a plurality of mounting plates arranged in a generally circular configuration. Each mounting plate has an inside surface and an outside surface. Each antenna element has a high frequency end and a low frequency end. The low frequency end of each antenna element is mounted to the inside surface of one of the mounting plates such that the high frequency ends of opposed antenna elements face each other. The high frequency ends of opposed antennas are separated by one wavelength of the signal frequency received at the high frequency end. The antenna system also includes a beamforming network having a plurality of input ports equal to the number of antenna elements. Each antenna element is coupled to the beamforming network through a respective input port.

In accordance with another aspect of the present invention, an antenna system is provided that includes a generally circular array of a plurality of antenna elements. The plurality of antenna elements are divided into a plurality of groups. The antenna system also includes a plurality of beamforming networks. Each beamforming network is connected to one antenna element group such that the plurality of antenna elements are interleaved with one another.

Antennas incorporating the present invention provide numerous technical advantages. For example, one embodiment of the invention has exhibited angle of arrival accuracy of 0.5 degrees over a 0.5 to 18 GHz frequency range and a full 360 degrees field of view. This embodiment incorporates elements that are dual polarized, high gain, and light weight as compared to low gain spiral or dipole antenna elements. In addition, the use of certain coaxial cavity antenna elements can extend the frequency range to 0.5 to 40 GHz.

Another technical advantage of the present invention is continuous track and scan DF capability over a field of view of 360 degrees in azimuth and a minimum of ±40 degrees in elevation. The present invention minimizes the problem of blindness once a target has been located. In addition, an antenna in accordance with the present invention has few parts, and is simple to assemble and implement. The capabilities of an antenna in accordance with the present invention are obtained in a small size that is light weight and low cost. Yet another technical advantage of the present invention is an antenna that has a dual use as a polarimeter in the same aperture used for DF capabilities.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings wherein.

DETAILED DESCRIPTION OF THE INVENTION

The present invention and its advantages are best understood by referring to FIGS. 1 through 7 of the drawings, like numerals being used for like and corresponding parts of the various drawings.

Figure 1:
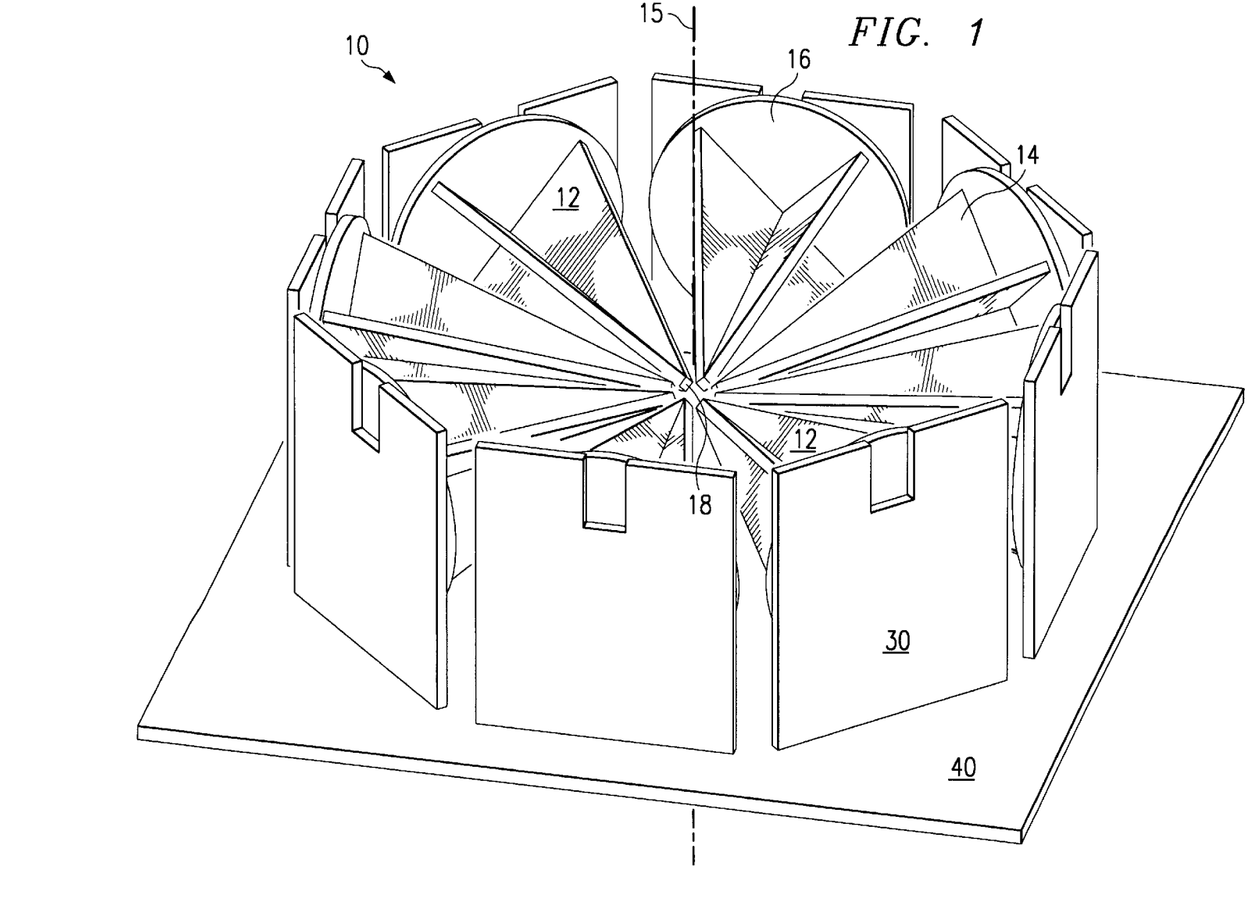
FIG. 1 is a schematic showing an isometric view of an antenna array representing one embodiment of the present invention.

FIG. 1 is an illustration of an antenna array 10 representing one embodiment of the present invention. Antenna array 10 comprises eight identical antenna elements 12 arranged perpendicular to the longitudinal axis 15. Each antenna element 12 in this particular embodiment of the present invention is a high gain, dual polarized log-periodic antenna. It should be understood, however, that other types of antenna elements can be used. The configuration of antenna elements 12 is discussed in more detail in conjunction with FIGS. 3A and 3B.

Figures 3A, 3B:
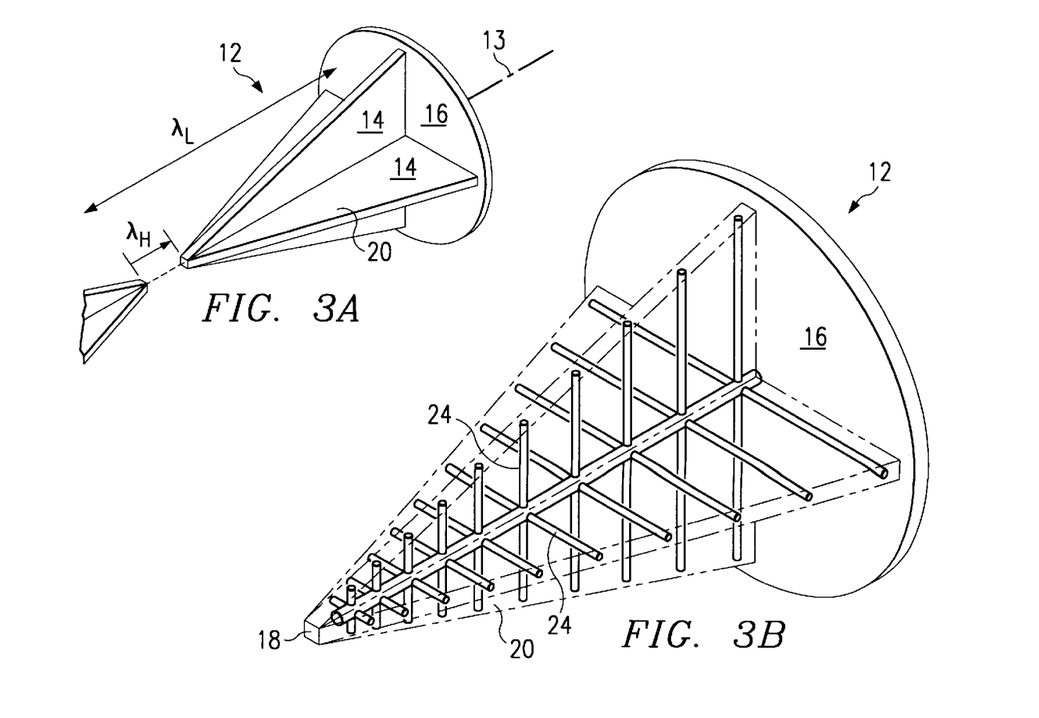
FIG. 3A is a schematic showing an isometric view of two opposed antenna elements of the antenna array of FIG. 1.
FIG. 3B is a schematic showing an isometric view of the antenna structure of the antenna element shown in FIG. 3A.

Reference is now made to FIGS. 3A and 3B. FIG. 3A is an illustration of two opposed antenna elements 12 as configured in antenna array 10. FIG. 3B illustrates an antenna structure 22 that is enclosed by a radome 20 shown in FIG. 3A. Referring to FIG. 3A, each antenna element 12 includes two triangular shaped elements 14. The triangular shaped elements 14 are disposed perpendicular to one another and mounted on a circular base 16.

As can be seen in FIG. 3B, each triangular shaped element 14 is composed of a plurality of radiators 24 for receiving and transmitting electromagnetic signals. The length of radiators 24 is greatest at the circular base 16 of antenna element 12 and decreases for those radiators approaching a tip 18. The radiators at the circular base 16 radiate and receive the lowest frequency in a selected bandwidth, while the radiators at the tip 18 radiate and receive the highest frequency in that bandwidth. As can be seen in FIG. 3B, the triangular shaped elements 14 are enclosed in a radome 20 to complete antenna element 12.

Figure 2:
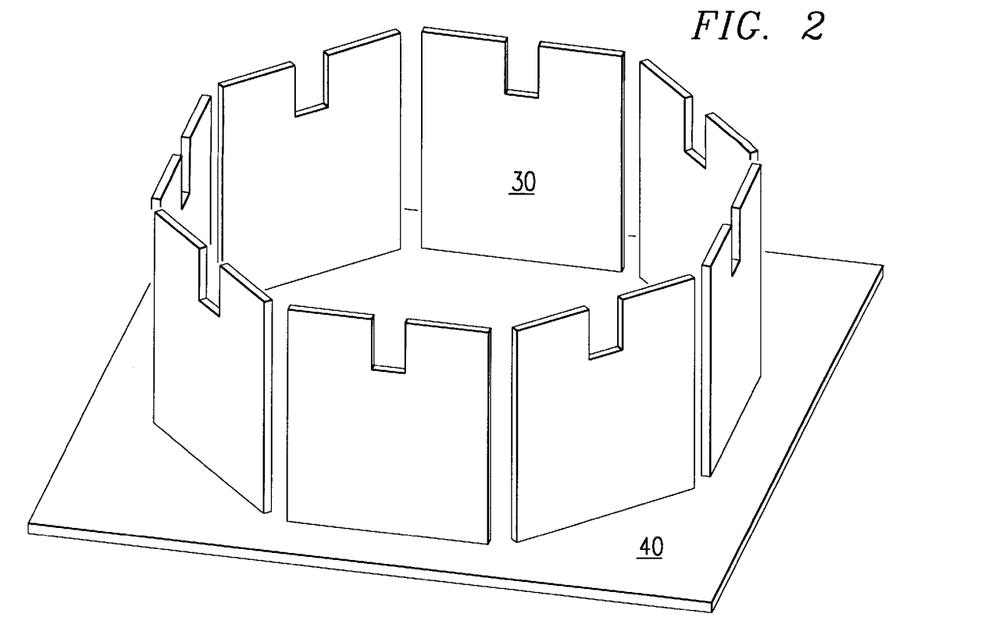
FIG. 2 is a schematic showing an isometric view of the antenna array shown in FIG. 1 with the antenna elements removed.

Referring now to FIG. 2, the structure of the antenna array 10 without antenna elements 12 is illustrated, so as to more clearly show the configuration of mounting plates 30. Eight mounting plates 30 are arranged in a generally circular configuration on top of a support frame 40. Each mounting plate 30 is structurally coupled to support frame 40 so as to provide a mounting for antenna elements 12.

Returning to FIG. 1, the circular base 16 of each antenna element 12 is fastened to a mounting plate 30 such that the tip 18 of each antenna element 12 generally points towards the center of the generally circular area formed by mounting plates 30. In so mounting antenna elements 12, the longitudinal axis 13 (see FIG. 3A) of each antenna element 12 generally intersect at the center of the circular area. In addition, longitudinal axis 13 of each successive antenna element 12 is offset by forty-five degrees in the azimuth plane of antenna array 10.

Although antenna array 10 is shown as being constructed using mounting plates 30 and a frame 40, variations of these parts can be used to support antenna elements 12 in the illustrated configuration. In addition, the antenna array has utility on ground, airborne, mobile, and seaborne platforms, to name a few.

Because of the close proximity of the antenna elements 12, the antenna array 10 can be described as an over-sampled interferometer. Interferometers are based on $n\lambda/2$ spacing of the antenna elements (where n is a whole number and $\lambda$ is the wavelength of frequency that is desired to be received). The angular spacing between antenna elements 12 in the azimuth plane of antenna array 10 is less than $\lambda/2$ at each point along the antenna element 12. This close spacing does not effect the AOA accuracy of the antenna array 10.

Referring back to FIG. 3A, the distance along longitudinal axis 13 between the tips 18 of two oppositely arrayed antenna elements is $\lambda_H$, where $\lambda_H$ is the highest frequency to be detected by antenna elements 12. Similarly, the spacing between the circular base 16 of the opposed antenna elements is $\lambda_L$, where $\lambda_L$ is the lowest frequency to be detected by antenna elements 12. This close spacing of antenna elements 12 allows for a small, yet effective, direction finding antenna.

In the embodiment illustrated in FIG. 1, each antenna element 12 is fastened to its respective mounting plate 30 such that both triangular shaped elements 14 are offset from the vertical and horizontal planes by forty-five degrees. This is called a "slant 45" configuration. When antenna elements 12 are oriented in the "slant 45" configuration, directly opposite antenna elements in the circular antenna array are cross polarized. Therefore, blockage in field of view of any of the antenna elements in the antenna array is minimized. It should be noted, however, that antenna elements 12 may also be oriented such that triangular shaped elements 14 are coincident with the vertical and horizontal planes. In this orientation, there is a small amount of blockage in field of view.

Furthermore, although eight antenna elements 12 are illustrated in FIG. 1, variations of the present inventions may use more or less antenna elements. The only requirement is that the number of antenna elements be equal to a power of two (i.e. $2^2$, $2^3$, etc.). However, a minimum of eight antenna elements is required in order to achieve high accuracy AOAs, whereas a minimum of four elements are required to obtain polarimetry capability in the same aperture.

In one variation of the present invention the antenna elements are mounted so as to point outward from the center of the circular array. However, pointing the elements inward offers some advantages. One advantage of pointing the elements inward is that such a configuration minimizes the blockage between antenna elements that are directly opposite in the circular array. Thus, oppositely located antenna elements are generally RF (radio frequency) transparent to each other. In addition, oppositely located antenna elements may also be cross-polarized.

In summary, the present invention may include modifications of the following three factors: the number of antenna elements, the facing direction of the antenna elements, and the orientation of the antenna elements (slant 45, etc.).

Unlike phased array antennas, the present invention does not require electronic beam scanning for 360 degree field of view coverage. Substantially the entire field of view is covered using a passive beamforming network. A typical beamforming network includes active amplifiers and limiters to boost received signals for identification and to set the system sensitivity and range. Each of the eight antenna elements 12 of the antenna array 10 are connected to a passive beamforming network (not explicitly shown). Examples of beamforming networks available for use with the antenna of the present invention include a Butler matrix or a Rotman lens beamformer.

Figure 6:
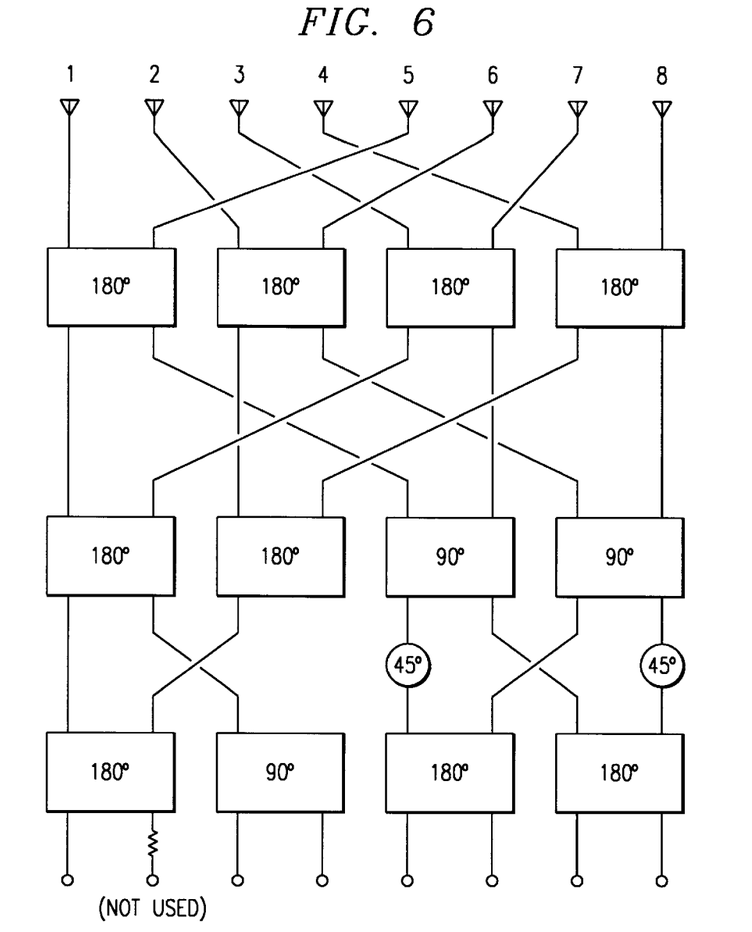
FIG. 6 is a diagram of a Butler matrix beamformer incorporated with various implementations of the present invention.

Referring now to FIG. 6, the configuration of a Butler matrix is shown that is connected to the antenna elements in some versions of the present invention. FIG. 6 illustrates an eight element Butler matrix utilizing a series of 180 degree hybrids and 90 degree hybrids to process the signals received by the antenna elements. The use of a Butler matrix is well documented in the field of antennas, and its operation will not be described in detail here.

Figure 7:
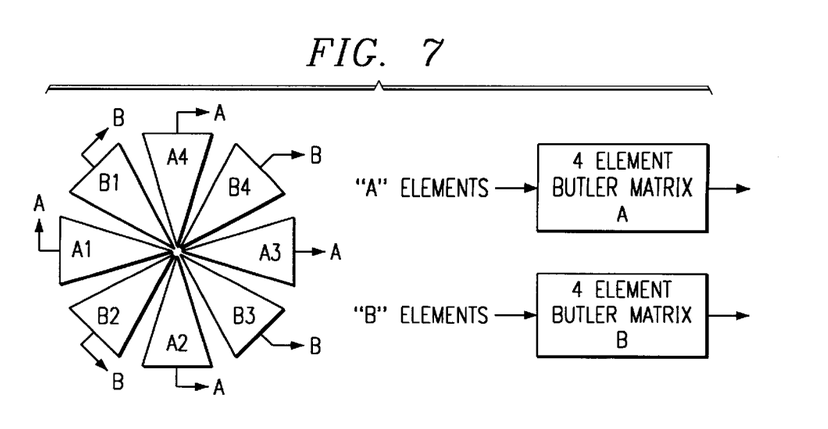
FIG. 7 is a diagram of an alternate configuration of Butler matrix beamformers incorporated with various implementations of the present invention.

Reference is now made to FIG. 7. Although Butler matrices are well-known, a unique interconnection of Butler matrices with the antenna array of the present invention provides several advantages. Instead of using one eight element matrix as illustrated in FIG. 6, it is also possible to use two four element Butler matrices. The four antenna elements of a four element system comprising four antenna elements and a four element Butler matrix are "interleaved" with the antenna elements of another four element system. FIG. 7 illustrates antenna elements A1, A2, A3 and A4 connected to Butler matrix "A" and interleaved with antenna elements B1, B2, B3 and B4, the latter connected to Butler matrix "B". The configuration of the two four element Butler matrices is not shown in detail. The construction of such matrices is well known to one skilled in the art.

The interleaving arrangement enables a reduction in the cost of the antenna array, while still maintaining the high AOA accuracy obtained with the version incorporating the eight element Butler matrix. The cost is reduced because this variation utilizes one less simultaneous receiver channel and enables the use of a Butler matrix using only 90 degree hybrids. Interleaving antenna elements in this manner is possible not only with the version of the present invention incorporating eight antenna elements, but also any antenna incorporating the present invention having a number of antenna elements equal to a multiple of four.

Through the use of one or more Butler matrices, antenna array 10, illustrated in FIG. 1, has all-polarization DF capability. Antenna array 10 enables dual slant 45 and dual circular polarization with slightly reduced capability for dual linear polarization. By changing the orientation of the antenna elements 12 to align triangular shaped elements 14 with the horizontal and vertical planes, the antenna of the present invention provides dual linear and dual circular polarization with slightly reduced capability for dual slant 45 polarization. Such an antenna has a potential AOA accuracy of 0.5 degrees, and with the additional processing of amplitude information increases the AOA accuracy to 0.25 degrees.

The antenna as described above incorporates dual polarized log periodic elements, however singularly polarized elements such as vertical, horizontal, slant +45, slant −45, right-handed circular, and left-handed circular polarized elements are possible alternatives.

Figure 4:
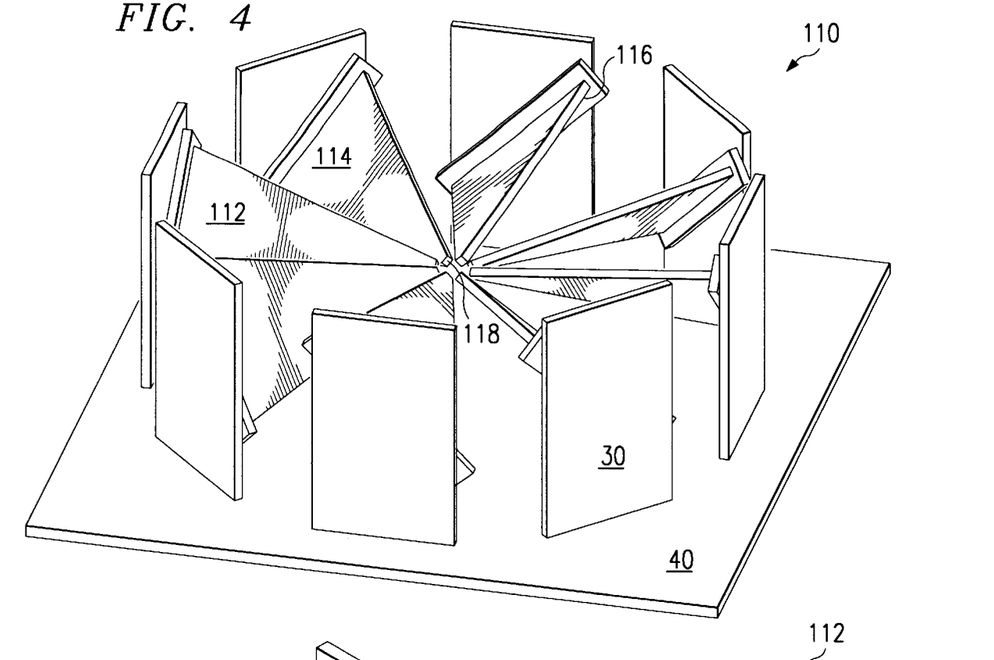
FIG. 4 is a schematic showing an isometric view of an antenna array representing another embodiment of the present invention.

FIG. 4 is an illustration of an antenna array 110 representing an antenna of the present invention incorporating log periodic antenna elements 112 oriented in a slant +45 configuration. The configuration of antenna array 110 is similar to antenna array 10 illustrated in FIG. 1. The primary difference between the antenna array of FIG. 1 and the antenna array of FIG. 4 is the type of antenna elements utilized. Antenna array 110 utilizes flat plane antenna elements 112 in place of the cross plane antenna elements 12 in antenna array 10. Antenna elements 112 are discussed in more detail in conjunction with FIGS. 5A and 5B.

Figures 5A, 5B:
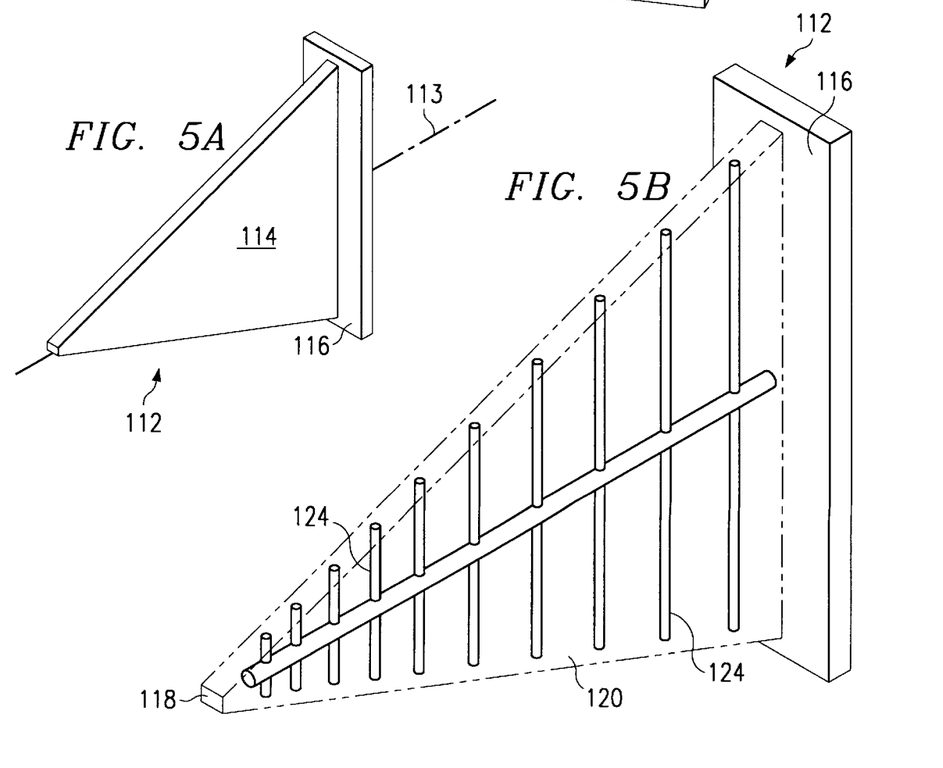
FIG. 5A is a schematic showing an isometric view of one of the antenna elements of the antenna array of FIG. 4.
FIG. 5B is a schematic showing an isometric view of the antenna structure of the antenna element shown in FIG. 5A.

FIG. 5A is an illustration of a flat plane antenna element 112. FIG. 5B illustrates the antenna radiating and receiving elements enclosed by a radome 120 as shown in FIGS. 5A. Antenna element 112 comprises a triangular shaped element 114 mounted on a rectangular base 116, and is comprised of a plurality of radiators 124 for receiving and transmitting electromagnetic signals. The radiators 124 are larger at the rectangular base 116 and decrease in size approaching a tip 118. The radiators at the rectangular base 116 radiate and receive the lowest frequency in a selected bandwidth, while the radiators at the tip 118 radiate and receive the highest frequency in that bandwidth. As best illustrated in FIG. 5B, the triangular shaped element 114 is enclosed in the radome 120.

Returning to FIG. 4, the rectangular base 116 of each antenna element 112 is fastened to a mounting plate 30 in such a way that a tip 118 of each antenna element 112 points towards the center of the generally circular area formed by mounting plates 30. In so mounting antenna elements 112, the longitudinal axis 113 of each antenna element intersects at the center of this generally circular area. In addition, the longitudinal axes 113 of each successive antenna element 112 is offset by forty-five degrees in the azimuth plane.

Each antenna element 112 is fastened to a respective mounting plate 30 such that triangular shaped element 114 is offset from the vertical and horizontal planes by forty-five degrees (a slant +45 configuration). It should be noted that by orienting triangular shaped element 114 vertically or horizontally, vertical or horizontal polarizations are obtainable. Slant −45 polarization is obtainable by orienting triangular shaped element 114 offset forty-five degrees from the vertical and horizontal planes in a direction opposite to that shown in FIG. 4. Other polarization orientations utilizing the antenna of the present invention are possible by changing the orientation of antenna elements 112 shown in FIGS. 1 and 4, as described above.

Figures 8, 9:
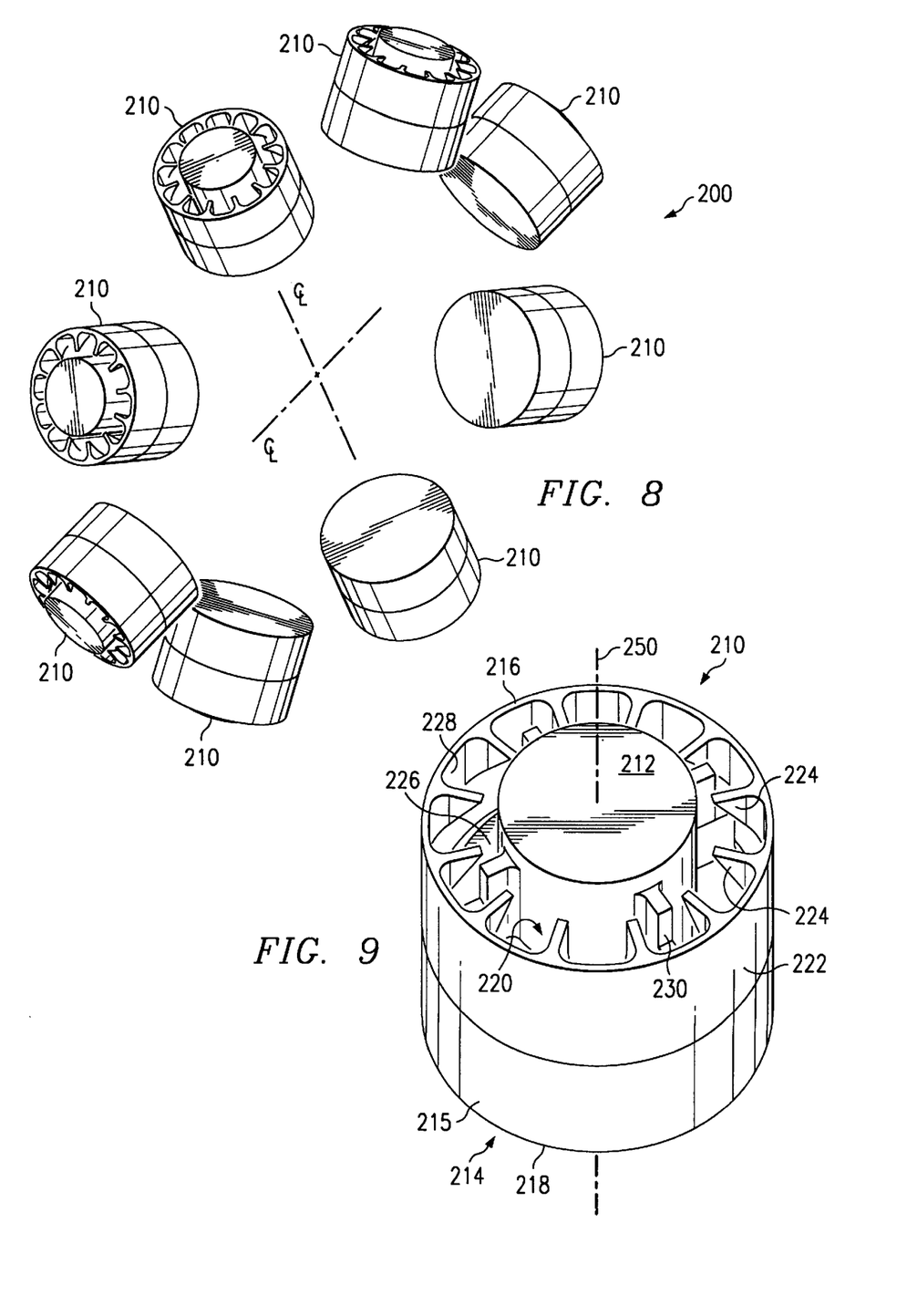
FIG. 8 is a schematic drawing showing an isometric view of an antenna array representing a variation of the present invention incorporating coaxial antenna elements.
FIG. 9 is a schematic drawing of an a coaxial antenna element of the antenna array shown in FIG. 8.

Still other antenna configurations can be constructed using other types of antenna elements. For example, FIG. 8 is a diagram of an antenna 200 in accordance with the present invention that utilizes coaxial cavity antennas as the antenna elements arranged in a circle. In this configuration, the antenna elements face outward, not inward, that is, the frequency receiving end faces away form the center. FIG. 9 shows an example of one type of coaxial antenna element 210 that may be used in conjunction with the antenna array of FIG. 8. In addition, a beamforming network as described above in relation to FIGS. 6 or 7 may also be used in conjunction with the antenna array shown in FIG. 8.

Referring now to FIG. 9 there is an illustration of a coaxial cavity antenna 210. Coaxial cavity antenna 210 includes a hollow, cylindrical inner conductor 212 and a cylindrical outer conductor 214 having opposite ends 216 and 218. In the illustrated embodiment, inner conductor 212 is closed at an end 216. However, inner conductor 212 can also be open at end 216, and this open space could serve as a circular waveguide antenna. In addition, although the illustrated embodiment incorporates a hollow inner conductor 212 to reduce the weight of coaxial cavity antenna 210, inner conductor 212 could also be solid. Outer conductor 214 is disposed outside of and generally concentric with inner conductor 212 about axis 250. The annulus between inner conductor 212 and the inner diameter of outer conductor 214 forms cavity 220.

Inner conductor 212, outer conductor 214, and cavity 220 are sized for effectively propagating electromagnetic waves in a range of frequencies. In the embodiment of FIG. 9, inner conductor 212 extends further outward along axis 250 than outer conductor 214. However, in other embodiments inner conductor 212 and outer conductor 214 are the same height. All elements of the embodiment illustrated in FIG. 9 can be scaled either larger or smaller to effectively propagate electromagnetic waves of lower or higher frequencies, respectively.

Outer conductor 214 includes an aperture ring 222 and a base 215. Aperture ring 222 can be formed integral with base 215 or it can be detachable from base 215. In the illustrated embodiment, aperture ring 222 includes an outer diameter equal to the outer diameter of base 215. In addition, in the embodiment in which aperture ring 222 is detachable, aperture ring 222 and base 215 are formed such that aperture ring 222 can be securely coupled to base 215. Aperture ring 222 includes a plurality of aperture teeth 224 that are disposed around the inside diameter of aperture ring 222. In the embodiment illustrated in FIG. 9, aperture teeth 224 are triangular in shape, and are disposed around the inside diameter of aperture ring 222 such that each aperture tooth 224 points generally towards axis 250 of coaxial cavity antenna 210. One purpose of aperture teeth 224 is for pattern control. More specifically aperture teeth 224 aid in making the E-plane and H-plane performance symmetric over very wide angles such as ±60 degrees.

Coaxial cavity antenna 210 further includes an iris ring 226. Iris ring 226 is formed so that it has an inner diameter approximately equal to the outer diameter of inner conductor 212. However, the outer diameter of iris ring 226 is less than the inner diameter of outer conductor 214. Iris ring 226 is thus disposed around and coupled with inner conductor 212 inside cavity 220, but iris ring 226 does not contact an inner wall 228 of outer conductor 214.

In addition, coaxial cavity antenna 210 includes a set of four aperture blocks or septums 230. In the embodiment shown in FIG. 9, septums 230 resemble a pair of steps. Septums 230 are coupled to iris ring 226 and inner conductor 212. Septums 230 are disposed around inner conductor 212 at ninety degree intervals, and are coupled to inner conductor 212 such that the plane of each septum 230 includes axis 250. One purpose of septums 230 is for pattern control, as mentioned above in conjunction with the aperture teeth. Another function of septums 230 is impedance matching.

All of the elements described above are preferably fabricated out of a conductive material. Aluminum offers a fairly lightweight and inexpensive option. However, for more weight-sensitive applications, conductive composite materials can be used.

Coupled to the inner wall 228 of outer conductor 214 are a plurality of cable supports 232. The number of cable supports 232 equals the number of coaxial cables (not explicitly shown) that are required to receive and transmit signals. In the embodiment shown in FIG. 9, there are four cable supports 232 and four coaxial cables (not explicitly shown). The coaxial cables are fed from end 218 of coaxial cavity antenna 210 through cable supports 232. The outer conductor of the coaxial cable is terminated to cable support 232 and the center conductor protrudes past this junction and into iris ring 226, which is connected to inner conductor 212, as described above. It should be noted that iris ring 226 and cable supports 232 are not in contact, although in the embodiment shown, they are in close proximity.

Figure 10:
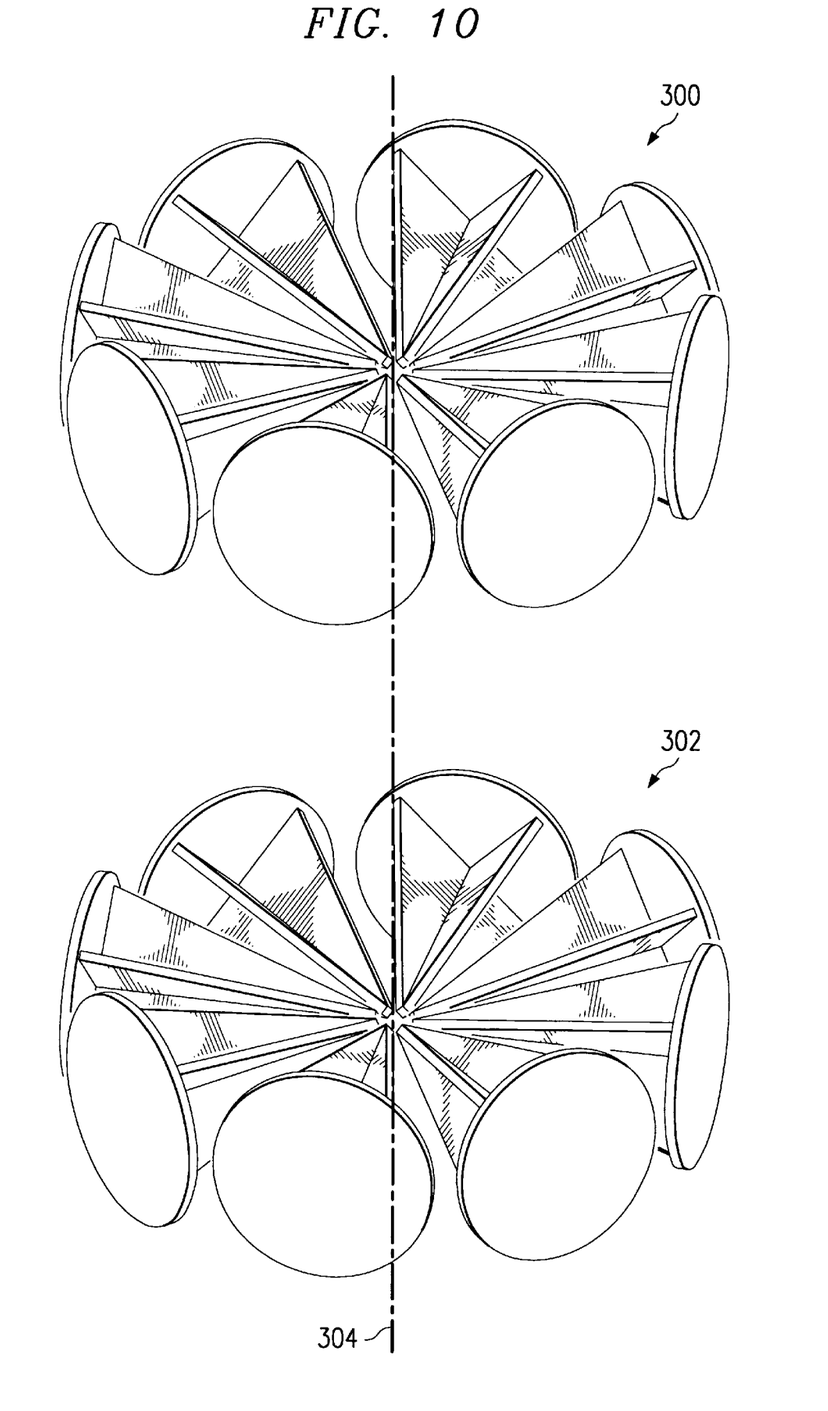
FIG. 10 is a schematic drawing showing an isometric view of yet another variation of the present invention incorporating a plurality of circular antenna arrays.

Referring now to FIG. 10, in yet another configuration of an antenna in accordance with the present invention multiple antenna arrays, such as illustrated in FIGS. 1, 4, or 8, are "stacked" to create an antenna system. FIG. 10 illustrates a stacked antenna system incorporating a plurality of antenna arrays 300 and 302 as described with reference to FIG. 1. The antenna arrays are positioned coaxial with one another about an axis 304 passing generally through the center of each circular array. The antenna elements are summed along the axis 304 in the Z-direction using a single beamforming network. Such a configuration operates to compress the elevation beamwidth. By "stacking" the arrays in this fashion, the antenna system has higher gain than single stack antenna arrays 10 and 110, illustrated in FIGS. 1 and 4. This tradeoff in elevational field of view for an increase in gain is useful when the antenna array is to be located some distance ("stand-off" distance) from potential signal emitters.

Figure 11:
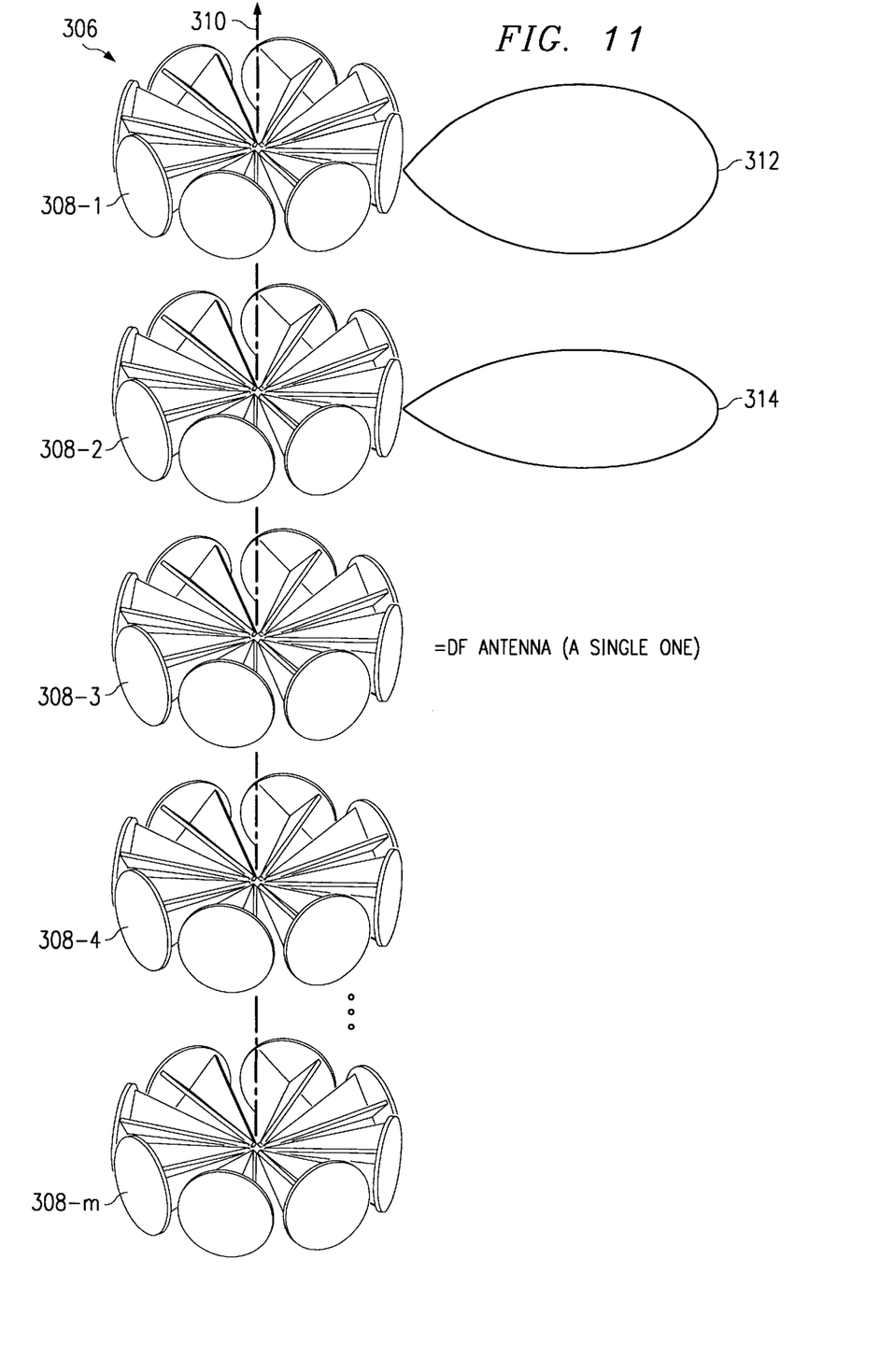
FIG. 11 is a schematic illustration of a stack of "n" circular antenna arrays.

Referring to FIG. 11, there is shown an expanded stacked antenna array 306 of a plurality of antenna arrays 308-1 through 308-n. The antenna arrays are positioned coaxial with one or another about an axis 310 passing generally through the center of each circular array. For every doubling of antenna area for the stack 306, there is an overall antenna gain increase of 3 dB and a decrease in beamwidth in accordance with the theory on phased array antennas. This decrease in beamwidth is schematically illustrated in FIG. 11 with the radiation pattern 312 for a single antenna array. The antenna pattern 314 is representative of a stack of four antenna arrays and illustrates the decrease in beamwidth.

Figure 12:
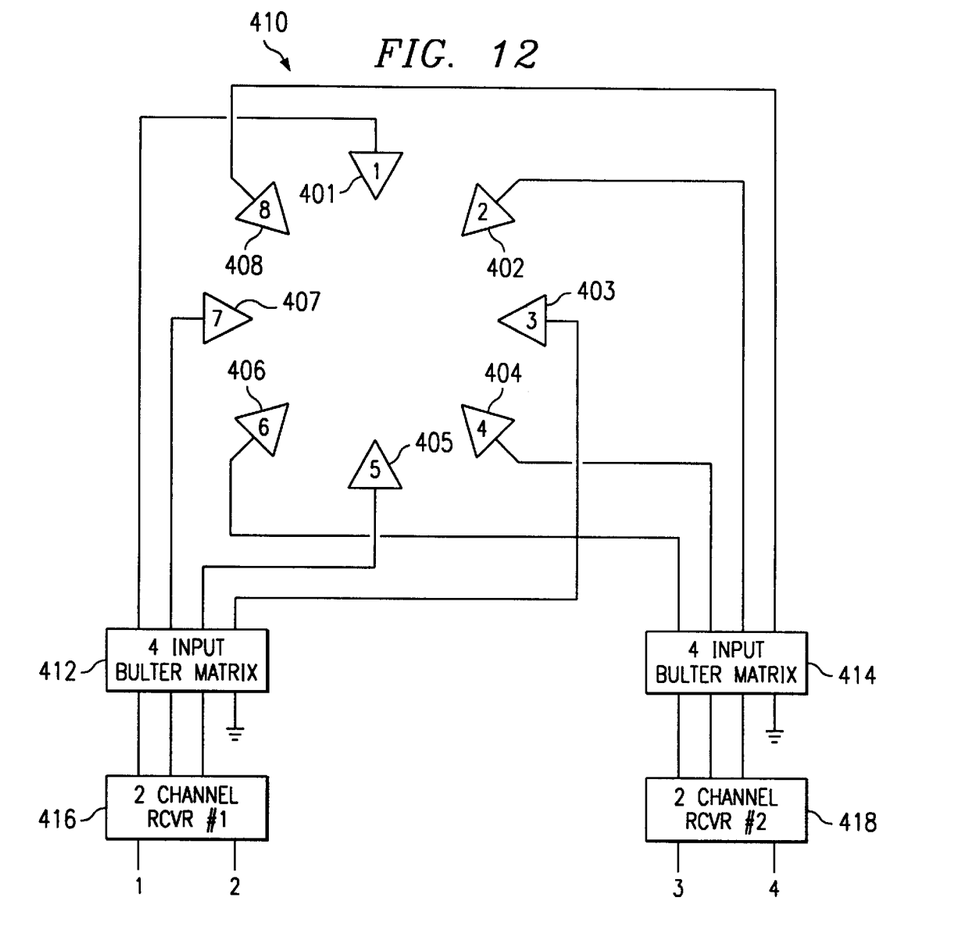
FIG. 12 is a diagram of an alternate configuration of Butler matrix beamformers incorporated with various implementations of the present invention.

Referring to FIG. 12, there is shown a diagram of an alternate configuration of Butler matrix beamformers incorporated with various implementations of antenna arrays of the present invention. Antenna elements 401 through 408 are part of an antenna array 410. Antenna elements 401, 403, 405, and 407 are interconnected to a four input Butler matrix 412 of a conventional design. Antenna elements 403 and 405 are connected to an input of the Butler matrix 412 on the low frequency end of the element. Antenna elements 401 and 407 are connected to the Butler matrix 412 at the high frequency end of the element.

Similarly, antenna elements 402, 404, 406, and 408 are connected to a four input Butler matrix 414. All of the antenna elements connected to the Butler matrix 414 are connected to the high frequency end of the element. Connected to the Butler matrix 412 is a two-channel receiver 416 having channel outputs 1 and 2 and connected to the Butler matrix 414 is a two-channel receiver 418 having outputs 3 and 4.

The Butler matrix beamformer as illustrated in FIG. 12 supplies different modes or progressions in phase at each of its outputs with antenna elements connected to the inputs as illustrated in FIG. 12. These phase progressions are in N-cycles of phase angle in degrees where N equals the number of antenna elements in the array. Each mode is associated with an appropriate output of the Butler matrix. A minimum of a two-channel receiver 416 or 418 is required in order to measure, for example, two modes. When a signal of interest is received at the antenna array 410, the zero electrical phase (degrees) crossing moves along the azimuth angle or field of view of the antenna. If a measure is taken of mode zero and mode zero plus one and these two modes are subtracted, the result is the azimuth angle or horizontal location of an emitter in 360° of field of view. This is a rudimentary AOA determination using only phase information. Amplitude information is not required in order to determine the lowest level of AOA. However, amplitude information can be used to increase AOA accuracy over that achieved with using only phase information.

Figure 13:
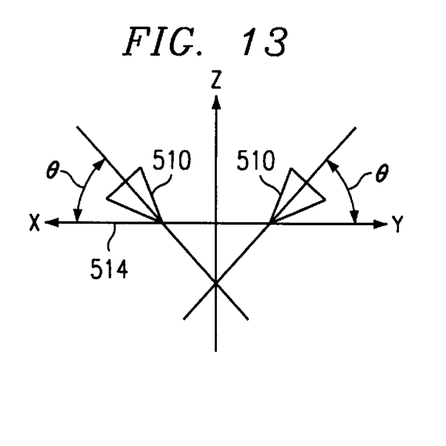
FIG. 13 is a schematic illustration of a circular antenna array with the antenna elements of FIG. 1 positioned at an angle to the longitudinal axis of the array.

As illustrated in FIGS. 1, 4, and 10, the longitudinal axis of the antenna elements is perpendicular to the longitudinal axis of the circular array. Referring to FIG. 13, the antenna elements 510 are positioned at an angle to the longitudinal axis 512.

The total longitudinal axis of the antenna elements 510 (only two shown) may be angled with reference to the axis 514 by a tilt angle θ. Inclining the antenna elements 510 optimizes signal gain and range detection depending on the mounting structure for the antenna. For example, in an air borne application where the elements have a full 360° pattern in azimuth, the antenna elements when tilted up such as illustrated in FIG. 13. A look angle of about 3° to 4° will optimize direction finding performance. However, it should be emphasized that although FIG. 13 illustrates the antenna elements 510 angled up from the axis 514, the elements may also be mounted at an angle below the plane of the axis 514.

Figure 14:
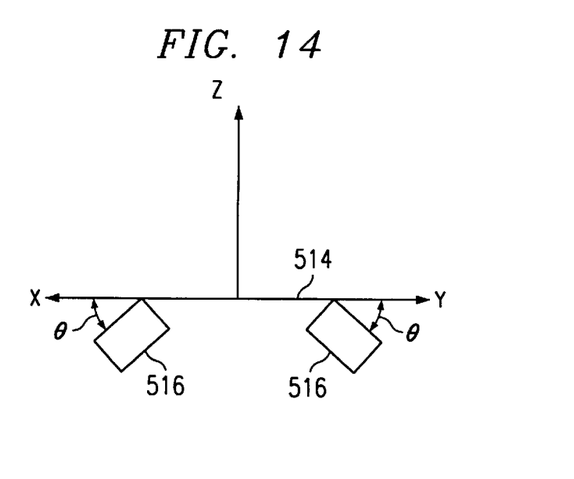
FIG. 14 is a schematic illustration of a circular antenna array with the antenna elements of figures positioned at an angle to the longitudinal axis of the array.

Referring now to FIG. 14, there is schematically illustrated an antenna array viewed in the plane of the horizontal axis 514. The antenna elements 516 are angled in a downward direction from the axis 514 by an angle θ. FIG. 14 illustrates the antenna elements 516 angled down from the axis 514, which is a variation from the upward angle as illustrated at FIG. 13. The antenna elements of FIG. 14 of the coaxial antennas as illustrated and described with reference to FIGS. 8 and 9.

Referring again to FIG. 11, the antenna elements of each of the antenna arrays 308-1 through 308-n, may be mounted at an angle with reference to the plane of the horizontal axis so long as all the elements are angled in the same direction with reference to the axis 310.

Although the present invention and its advantages have been described in detail, it should be understood that various changes, substitutions, and alterations can be made therein without departing from the spirit and scope of the present invention as defined by the appended claims.

What is claimed is:

1. An antenna system comprising:
    a plurality of mounting plates arranged in a generally circular configuration, each mounting plate having an inside surface and an outside surface; and
    a plurality of antenna elements, each antenna element having a high frequency end and a low frequency end, the low frequency end of each antenna element mounted to the inside surface of one of the plurality of mounting plates, the high frequency ends of opposed antenna elements facing each other and separated by one wavelength of the signal frequency received at the high frequency end.

2. The antenna of claim 1, wherein the angular spacing between each antenna element in the azimuth plane is less than $\lambda$, where $\lambda$ is the wavelength of a signal in a selected bandwidth.

3. The antenna system of claim 1, wherein the number of antenna elements equals $2^N$, where N is a positive whole number.

4. The antenna system of claim 1, comprising an even number of antenna elements, the antenna elements spaced equidistant around an azimuth plane of the generally circular array such that each antenna element is directly opposed to another antenna element.

5. The antenna system of claim 4, wherein each pair of opposed antenna elements have cross-polarization.

6. The antenna system of claim 4, wherein each pair of opposed antenna elements are RF transparent to each other.

7. The antenna system of claim 1, wherein the plurality of antenna elements comprise log periodic elements.

8. The antenna system of claim 7, wherein the log periodic elements have a gain greater than five decibels linear isotropic.

9. The antenna system of claim 7, wherein the log periodic elements have a bandwidth greater than four octaves.

10. The antenna system of claim 7, wherein each log periodic element comprises dual polarization along the vertical and horizontal planes.

11. The antenna system of claim 7, wherein each log periodic element comprises dual polarization along planes offset forty-five degrees from horizontal and vertical planes.

12. The antenna system of claim 7, wherein each log periodic element comprises a single polarization, the single polarization chosen from the following group: vertical polarization, horizontal polarization, slant +45 polarization, slant −45 polarization, left-handed circular polarization, and right-handed circular polarization.

13. An antenna system comprising:
    an antenna element mount having a generally circular configuration; and
    a plurality of antenna elements, each antenna element having a high frequency end and a low frequency end, each of the plurality of antenna elements comprising a plurality of radiators receiving and transmitting electromagnetic signals, the length of each radiator decreasing from the low frequency end to the high frequency end, the low frequency end of each antenna element mounted to the antenna element mount, the high frequency end of opposed antenna elements in a facing arrangement and separated by one wavelength of the signal frequency transmitted or received at the high frequency end.

14. The antenna system of claim 13, wherein each antenna element has a longitudinal axis and the angular spacing between the longitudinal axis of each antenna element in the azimuth plane is less than $\lambda$, where $\lambda$ is the wavelength of a signal in a selected bandwidth.

15. The antenna system of claim 13, wherein each pair of opposed antenna elements have cross-polarization.

16. The antenna system of claim 13, wherein opposed antenna elements are RF transparent to each other.

17. The antenna system of claim 13, wherein the plurality of antenna elements comprise log periodic elements.

18. The antenna system of claim 17, wherein the log periodic elements have a bandwidth greater than four octaves.

19. The antenna system of claim 13 wherein the generally circular configuration has a longitudinal axis and each of the antenna elements has a longitudinal axis substantially perpendicular to the longitudinal axis of the circular configuration.

20. The antenna system of claim 13 wherein the generally circular configuration has a longitudinal axis and each antenna element has a longitudinal axis at an angle λ with reference to the longitudinal axis of the circular configuration.

21. An antenna system comprising:

a plurality of mounting plates arranged in a generally circular configuration, each mounting plate having an inside surface and an outside surface;

a plurality of antenna elements, each antenna element having a high frequency end and a low frequency end, the low frequency end of each antenna element mounted to the inside surface of one of the plurality of mounting plates, the high frequency ends of opposed antenna elements facing each other and separated by one wavelength of the signal frequency received at the high frequency end; and a beamforming network having a plurality of input ports equal to the number of antenna elements, each antenna element coupled to the beamforming network through a respective input port.

22. The antenna system of claim 21, wherein the beamforming network comprises a Butler matrix.

23. The antenna system of claim 21, wherein:

the number of antenna elements equals a multiple of four; and the beamforming network comprises one Butler matrix for each set of four antenna elements, each Butler matrix coupled to a selected four antenna elements such that the antenna elements are interleaved.

24. The antenna system of claim 21, wherein the beamforming network comprises a Rotman lens beamformer.

25. An antenna system comprising:

an antenna element mount having a generally circular configuration;

a plurality of antenna elements, each antenna element having a high frequency end and a low frequency end, the low frequency end of each antenna element mounted to the antenna element mount, the high frequency ends of opposed antenna elements positioned in a facing arrangement; and a beamforming network having a plurality of input ports equal to a number of antenna elements, each antenna element coupled to the beamforming network through a respected input port.

26. The antenna system of claim 25, wherein the beamforming network comprises a Butler matrix.

27. A polarimeter comprising:

a generally circular array of a plurality of coaxial cavity antenna elements, each antenna element of the plurality having a frequency receiving end facing away from a center of the circular array; and a beamforming network comprising a plurality of input ports equal to the number of antenna elements, each antenna element coupled to the beamforming network through one of the input ports.

28. An antenna system, comprising:

an antenna element mount having an inside surface and an outside surface; and a plurality of coaxial cavity antenna elements mounted to the outside surface of the antenna element mount in a generally circular array configuration, each antenna element having a signal receiving end facing away from the outside surface of the antenna element mount.

29. The antenna system of claim 20, further comprising a beamforming network comprising a plurality of input ports equal to the number of antenna elements, each antenna element coupled to the beamforming network through a respective input port.

30. The antenna system of claims 28, wherein:

the number of antenna elements equals a multiple of four; and the beamforming network comprises one Butler matrix for each set of four antenna elements, each Butler matrix coupled to a selected four antenna elements such that the antenna elements are interleaved.

31. An antenna system comprising:

a first generally circular antenna array comprising a plurality of coaxial cavity antennas positioned about a center axis, each antenna having a frequency receiving end facing away from a center axis of the generally circular array; and at least one additional generally circular antenna array comprising a plurality of coaxial cavity antennas, each at least one additional circular antenna array coaxial with the axis of the first circular antenna array and positioned relative thereto such that the at least one additional antenna array has an axis coaxial with the axis of the first circular antenna array about an axis passing generally through a center of each circular antenna array.

32. An antenna system, comprising:

a plurality of antenna elements, each antenna element having a high frequency end and a low frequency end, the low frequency end of each antenna element mounted in a generally circular configuration, the high frequency ends of opposed antenna elements facing each other and separated by one wavelength of the signal frequency received at the high frequency end, each pair of opposed antenna elements having cross-polarization.

* * * * *

UNITED STATES PATENT AND TRADEMARK OFFICE
CERTIFICATE OF CORRECTION

PATENT NO.    : 6,295,035 B1
DATED         : September 25, 2001
INVENTOR(S)   : Timothy R. Holzheimer Page 1 of 1

It is certified that error appears in the above-identified patent and that said Letters Patent is hereby corrected as shown below:

<u>Column 8,</u>
Line 37, after "of", delete "3 dB", and insert -- 3dB --.

<u>Column 12,</u>
Line 13, after "claim", delete "20", and insert -- 28 --.

Signed and Sealed this

Thirteenth Day of August, 2002

Attest:

Attesting Officer

JAMES E. ROGAN
*Director of the United States Patent and Trademark Office*